Dec. 12, 1950     A. C. BOOCK ET AL     2,533,872
TRACTOR CONTROL MECHANISM

Filed April 16, 1948     2 Sheets-Sheet 1

Inventors
Alfred C. Boock
Douglas W. Erskine
by W. Girald
Attorney

Dec. 12, 1950 A. C. BOOCK ET AL 2,533,872
TRACTOR CONTROL MECHANISM
Filed April 16, 1948 2 Sheets-Sheet 2

Inventors
Alfred C. Boock
Douglas W. Erskine
by W. Gierold
Attorney

Patented Dec. 12, 1950

2,533,872

UNITED STATES PATENT OFFICE 2,533,872

TRACTOR CONTROL MECHANISM

Alfred C. Boock and Douglas W. Erskine, Springfield, Ill., assignors to Allis-Chalmers Manufacturing Company, Milwaukee, Wis., a corporation of Delaware Application April 16, 1948, Serial No. 21,397

11 Claims. (Cl. 180—6.62)

The invention relates to motor vehicles, and more particularly to motor vehicles of the type in which the drive of a pair of propelling units, such as a pair of track belts, at opposite sides of the vehicle may be controlled so as to cause either straight course driving or turning of the vehicle.

In such vehicles it is customary to provide a power transmitting mechanism which is operable, as for instance by means of a pair of steering clutches, to control the drive of the propelling units; further, to provide a pair of auxiliary mechanisms, as for instance a pair of actuating mechanisms for the steering clutches, for controlling the operation of the power transmitting mechanism; and finally, to provide a pair of manually operable mechanisms, such as a pair of link and lever systems, for controlling the auxiliary mechanisms.

The present invention is concerned more particularly with the last of the mentioned mechanisms, that is, with the manually operable mechanisms which control the mentioned auxiliary mechanisms and by means of which steering of the vehicle may be initiated at the will of the driver.

In crawler tractors of conventional construction the power transmitting mechanism which is operable to control the drive of the propelling units is usually enclosed in a housing at the rear of the tractor, and a driver's station at the rear of the tractor includes a seat over said housing; a dash panel forwardly of the seat; and a deck or other foot rest between the dash panel and the seat. The mentioned auxiliary mechanisms are usually controlled by means of a pair of manually operable control levers which are suitably arranged in front of the driver's seat so that a driver may conveniently steer the tractor from a normal sitting position on the seat by manipulating one of these levers with his right hand and the other with his left hand. In order to provide for movement of the handle ends of the control levers within suitable operating ranges rearwardly of the dash panel and above the deck, it has heretofore been customary to pivot these levers at or below the level of the deck so that they extend in a generally upward direction in front of the seat when adjusted for straight course driving, and so that the tractor may be steered to the right or left by backward pull on the right hand or left hand control lever, respectively. A pair of brake pedals which may be provided in addition to the manually operable control levers, are suitable arranged within reach of the driver's feet.

The customary arrangement of the manually operable control levers in the manner outlined hereinbefore entails certain difficulties and inconveniences which are well known in the art. For instance, it is a common experience that these levers, as customarily arranged, are more or less in the way of the driver when he wants to get into and out of the seat, or when he wants to take a standing position in front of the seat while operating the tractor, or when he wants to look back by turning around in a sitting position and in doing so wants to move his legs to a natural and convenient position.

Generally, it is an object of the invention to provide a crawler tractor or similar motor vehicle of the above mentioned character, which may be steered by means of a pair of manually operable control levers in front of the driver's seat, but which overcomes the difficulties and avoids the inconveniences of the prior art which have been pointed out hereinbefore.

More specifically, it is an object of the invention to provide an improved control system for the mentioned auxiliary mechanisms.

Another object of the invention is to provide an improved link and lever system for controlling the mentioned auxiliary mechanisms, which will not objectionably interfere with the movements of the driver in getting into and out of the seat, which will enable the driver to operate the tractor conveniently either from a sitting or from a standing position, and which will permit the driver to move his legs to a natural and convenient position when he turns around in the seat in order to observe or adjust a trailing vehicle, such as a self-loading scraper, which may be hitched to the tractor.

A further object of the invention is to provide an improved link and lever system of the above outlined character, which is particularly adapted for use in tractors in which the operator's station includes a wide two man seat, and in which the manually operable control levers are arranged at one side of the tractor whereas the mentioned auxiliary mechanisms are arranged symmetrically of the tractor in proximity to the center between the traction units and below said seat.

A further object of the invention is to provide an improved link and lever system of the above mentioned character which may be installed on the tractor without difficulty, and which may readily be adjusted and readjusted to proper working condition.

These and other objects and advantages are attained by the present invention, various novel features of which will be apparent from the description herein and the accompanying drawings, disclosing an embodiment of the invention, and will be more particularly pointed out in the appended claims.

Referring to the drawings:

Fig. 3 is a diagrammatic view showing a development of the improved link and lever system shown in Figs. 1 and 2;

Figure 1:
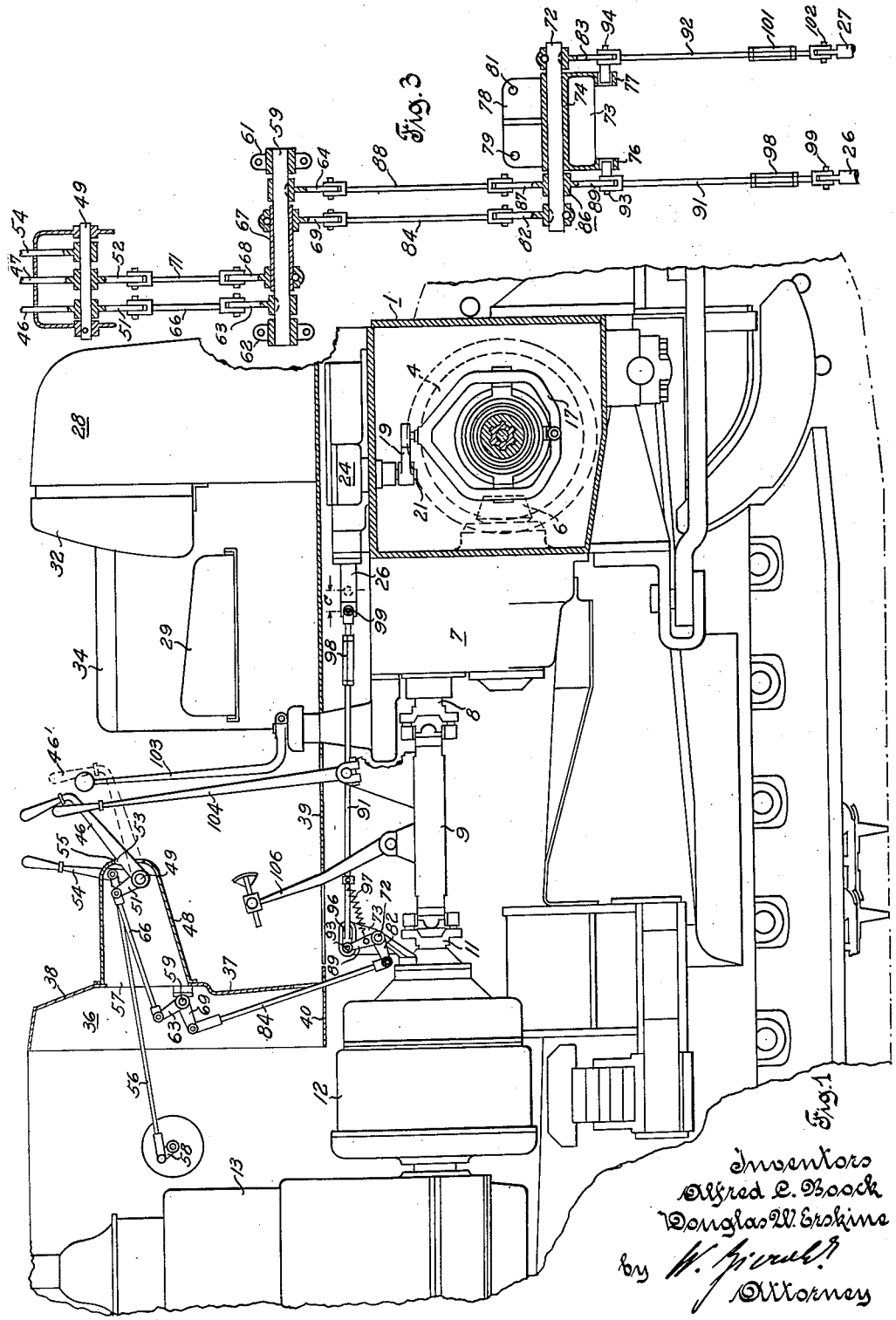
Fig. 1 is a side view of the driver's station and adjacent parts of a crawler tractor, portions at the near side of the tractor, being omitted to expose the improved link and lever system and associated parts.

The crawler tractor which has been selected for purposes of illustrating the invention in the drawings involves the well known clutch and brake steering principle which requires a pair of clutches for interrupting the drive to one or the other of the track units, and a pair of brakes for retarding or arresting the deenergized track unit.

Figure 2:
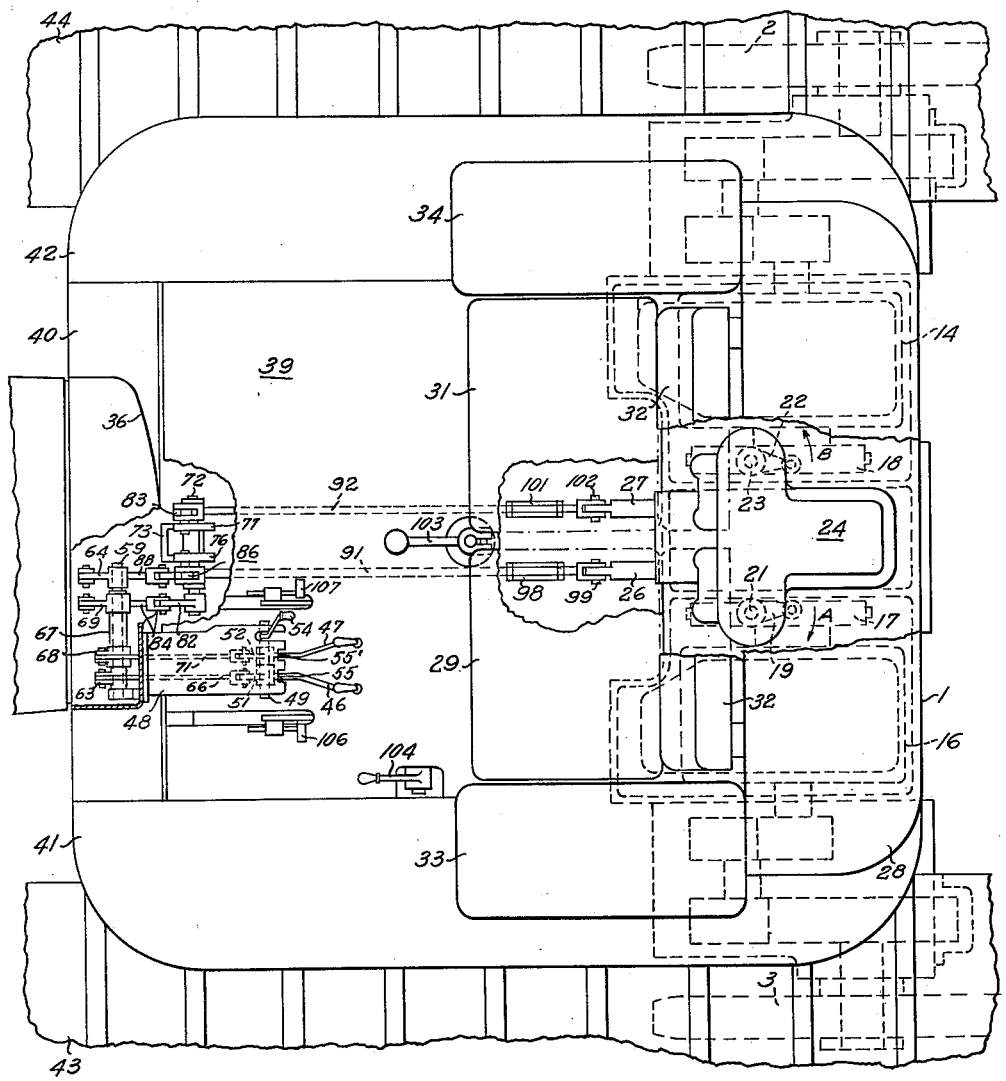
Fig. 2 is a top view of the general assembly shown in Fig. 1, parts of the dash panel and of the deck overlying the link and lever system, and parts at the rear of the driver's station overlying a power control mechanism being broken away for purposes of exposure.

Referring to Figs. 1 and 2, the reference character 1 generally designates a large transmission housing which is located at the rear of the tractor and which encloses the usual mechanism for transmitting power to a pair of track belt drive sprockets 2 and 3. A bevel gear 4 (Fig. 1) and a bevel pinion 6 in mesh therewith are mounted in a central wet compartment of the transmission housing 1, the bevel pinion 6 being driven by the output shaft of a change speed transmission 7 which is secured to the forward side of the transmission housing 1. An input shaft 8 of the change speed transmission is connected by means of a propeller shaft 9 with the output shaft 11 of a power transmitting unit 12 which comprises a hydraulic torque converter and a master clutch, and an operating mechanism for the master clutch, not shown. An internal combustion engine 13, the rear end of which is shown in Fig. 1, is installed in a forward location on the tractor for supplying driving power to the unit 12, and through the latter to propeller shaft 9, change speed transmission 7, and bevel gears 6 and 4.

Referring to Fig. 2, a pair of steering clutches 14 and 16 are enclosed in right and left dry compartments, respectively, of the transmission housing 1 and are arranged in the usual manner for transmitting power from the bevel gear 4 to the drive sprockets 2 and 3, respectively. A shift yoke 17 for the left hand steering clutch 16 is suitably mounted within the left dry compartment of the transmission housing 1 for back and forth movement transversely of the tractor, and a corresponding shift yoke 18 for the right hand steering clutch 14 is similarly mounted within the right dry compartment of the transmission housing. An actuating arm 19 for the shift yoke 17 is secured to the lower end of a vertical shaft 21 which extends upwardly through the top wall of the transmission housing 1 in proximity to the steering clutch 16, and a similar actuating arm 22 for the shift yoke 18 is secured to the lower end of another vertical shaft 23 which extends through the top wall of the transmission housing 1 in proximity to the steering clutch 14.

Mounted on top of the transmission housing 1 is a power control unit, generally designated by the reference character 24, which comprises two hydraulically operable servo motors for rotating the shafts 21 and 23, respectively, and thereby swinging the actuating arms 19 and 22 in clutch disengaging directions, as indicated by the arrows A and B in Fig. 2. The power control unit 24 may be of any suitable type, for instance as disclosed in a copending application Serial No. 615,230, filed September 8, 1945, by W. H. Bruce and D. W. Erskine, now U. S. Patent 2,444,279, dated June 29, 1948. As shown in Figs. 1 and 2 of the accompanying drawings, the unit 24 includes a pair of control plungers 26 and 27 which are reciprocably mounted within the housing of the unit 24 for horizontal back and forth movement independently of each other. In Fig. 2, the actuating arms 19 and 22 are shown in clutch engaged positions, and the power control unit is operative in response to backward movement of the control plunger 26, that is movement of the control plunger 26 from the inoperative position in which it is shown in Fig. 2 to an operative position, to swing to clutch actuating arm 19 in clutch disengaging direction, as indicated by the arrow A. On the other hand, backward movement of the control plunger 27 from its inoperative position in which it is shown in Fig. 2 to an operative position causes the power control unit 24 to swing the actuating arm 22 in clutch disengaging direction, as indicated by the arrow B.

Referring to the driver's station, a relatively wide driver's seat is arranged above the transmission housing 1 and in front of a large fuel tank 28. The seat comprises a pair of seat cushions 29 and 31, a back rest 32 which is mounted on the forward wall of the fuel tank 28, and a pair of arm rests 33 and 34 adjacent to the seat cushions 29 and 31, respectively. Mounted on the tractor at a substantial distance forwardly from the driver's seat, is a dash panel 36 which as shown in Fig. 2 is of somewhat narrower width transversely of the tractor than the spacing between the arm rests 33 and 34. The dash panel 36 is preferably made of heavy gauge sheet metal and comprises a lower part 37 which forms a generally vertical wall member, and an upper, forwardly inclined part 38 on which instruments such as a fuel gauge, an oil pressure gauge, and the like may be mounted for ready observation from the driver's seat. The dash panel 36 as a whole is curved transversely of the tractor, as indicated in Fig. 2, and is mounted so that its convex side faces the driver's seat and its concave side faces the engine 13.

The floor of the driver's station is formed by a platform or deck which comprises horizontal sheet metal plates 39 and 40 of substantially the same width as the spacing between the arm rests 33 and 34, and a pair of fenders 41 and 42 which extend in the same horizontal plane as the plates 39 and 40 and laterally therefrom over the track belts, which are generally indicated in Fig. 2 by the reference characters 43 and 44.

A pair of manually operable control levers 46 and 47 are mounted in front of the seat cushion 29 on a bracket 48, and are operatively connected, respectively, with the control plungers 26 and 27 through a link and lever system which will be described more fully hereinbelow. The bracket 48 is secured to the vertical part 37 of the dash panel 36 and extends rearwardly therefrom in vertically spaced relation to the floor plate 39, as best shown in Fig. 1. The bracket 48 is constructed in the form of a hollow casting, and a shaft 49 is mounted at its opposite ends within the side walls of the casting so as to extend transversely of the tractor, as indicated in Figs. 2 and 3. The control levers 46 and 47 are pivoted side by side on the shaft 49 within the bracket 48, and the arms of these levers which carry the operating handle extend through vertical slots, respectively, at the rear end of the bracket 48. The lever 46, as shown in Fig. 1, has a short arm 51 within the bracket 48 and the lever 47 has a similar arm 52, as indicated in Fig. 2. In the full line position in which the lever 46 is shown in Fig. 1, a stop 53 on the long arm of this lever engages a stationary stop 55 at the upper end of the respective slot in the bracket 48 so as to limit upward swinging movement of the lever 46 about the shaft 49 and thereby determine a straight course driving position of said lever 46. The control lever 47 has a similar stop which is engageable with a stationary stop 55' (Fig. 2) at the upper end of the respective slot of the bracket 48 to limit upward swinging movement of the lever 47 about the shaft 49 and thereby determine a straight course driving position of the lever 47.

In addition to the control levers 46 and 47, a throttle control lever 54 is pivoted on the shaft 49 at the right side of the control lever 47, as shown in Figs. 1 and 3. The throttle control lever 54 extends through another slot in the bracket 48, and a link 56 is pivoted to the lever 54 inside of the bracket 48 and extends forwardly through an opening 57 which is formed in the wall part 37 of the dash panel 36 and in registry with the open rear end of the bracket 48. The forward end of the link 56 is connected to a crank arm 58 of a suitable throttle operating mechanism, not shown.

Fig. 3 shows a development of the link and lever system through which the control levers 46 and 47 are operatively connected with the control plungers 26 and 27, respectively, of the power control mechanism 24. As shown in Figs. 2 and 3, an upper transverse rock shaft 59 is rotatably mounted in bearings 61 and 62 on the forward side of the dash panel 36, in upwardly spaced relation to the platform comprising the floor plates 39 and 40, and in rearwardly spaced relation to the pivot axis of the control levers 46 and 47. Nonrotatably secured to the upper rock shaft 59 are a pair of first lever arms 63 and 64 in axially spaced and angularly displaced relation to each other, one of said first lever arms, namely the arm 63, being transversely aligned with the arm 51 of the control lever 46 and link connected thereto by means of an upper fore and aft reciprocable link 66. The upper rock shaft 59 is surrounded, intermediate the first lever arms 63 and 64, by a tubular shaft 67 which is rotatable relative to the shaft 59 and has a pair of second lever arms 68 and 69 which are nonrotatably secured to the tubular shaft in axially spaced and angularly displaced relation to each other. One of said second lever arms, namely the arm 68, is transversely aligned with the short arm 52 of the control lever 47 and link connected thereto by means of an upper fore and aft reciprocable link 71. The link 71, as well as the link 66, extend through the opening 57 of the dash panel 36. The link 66 is pivotally connected at its rear end with the short arm 51 of the control lever 46 and at its forward end with the arm 63 of the rock shaft 59, and the link 71 is pivotally connected at its rear end with the short arm 52 of the control lever 47 and at its forward end with the arm 68 of the tubular shaft 67.

Figures 4, 5:
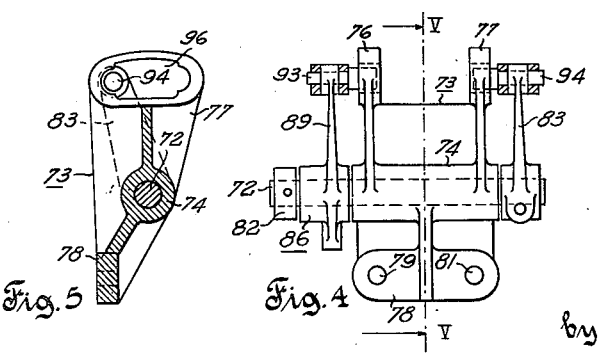
Fig. 4 is a detail view of rock shaft and bracket assembly forming part of the improved link and lever system shown in Figs. 1, 2 and 3.
Fig. 5 is a sectional view on line V—V of Fig. 4.

A lower rock shaft 72 is mounted below the floor plate 39 of the deck in a bracket 73 which, as shown in Fig. 1, is secured to a tapered housing portion of the unit 12, in a position so as to extend upwardly therefrom. As shown in Figs. 4 and 5, the bracket 73 has a sleeve portion 74 and a pair of side arms 76 and 77 which extend upwardly from the sleeve portion 74 at the opposite sides of the bracket. A base part 78 of bracket 73 has a pair of holes 79 and 81 for the reception of mounting bolts which secure the bracket to the housing of the unit 12.

Referring to Fig. 2, it will be noted that the mounting bracket 48 for the control levers 46 and 47 is located at the left side of the tractor directly opposite to the seat cushion 29, and that the mounting bracket 73 for the lower rock shaft 72 is mounted at the center of the tractor, that is, midway between the vertical planes of the track belt drive sprockets 2 and 3. In the diagrammatic view of Fig. 3, the bracket 73 is shown in an upside down position for purposes of clarification.

The lower rock shaft 72 extends through the sleeve portion 74 of the bracket 73 and, at opposite sides of the latter, carries a pair of third lever arms 82 and 83 which are nonrotatably secured to the shaft 72 in axially spaced and angularly displaced relation to each other, one of said third lever arms, namely the lever arm 82, being transversely aligned with the lever arm 69 of the tubular shaft 67 and link connected thereto by means of an up and down reciprocable link 84. A bellcrank lever 86 is pivoted coaxially with the lower rock shaft 72 intermediate the third lever arms 82 and 83 and has an arm 87 which is transversely aligned with the lever arm 64 of the upper rock shaft 59 and link connected thereto by means of an up and down reciprocable link 88. The control plunger 26 is link connected with an arm 89 of the bellcrank lever 86 by a fore and aft reciprocable link 91, and the control plunger 27 is link connected with the arm 83 of the lower rock shaft 72 by means of a fore and aft reciprocable link 92.

The forward end of the lower link 91 is pivotally connected to the arm 89 of the bellcrank lever 86 by means of a pivot pin 93 and the lower link 92 is pivotally connected with the arm 83 of the lower rock shaft 72 by means of a pivot pin 94. Referring to Figs. 4 and 5, the pivot pin 94 which is mounted on the free end of the lever arm 83 has an axial extension which works within a slot 96 of the side arm 77 of the bracket 73, and the pivot pin 93 which is mounted on the free end of the bellcrank arm 89 has an axial extension which works within a corresponding slot of the side arm 76 of the bracket 73. The axial extensions of the pivot pins 93 and 94 constitute movable stop means which are associated, respectively, with the lower links 91 and 92, and the slotted arms 76 and 77 of the bracket 73 constitute stationary stop means which are engageable by the movable stop means 93, 94 to determine forward and rearward limit positions of the lower links 91 and 92, respectively. As shown in Fig. 1, a coil spring 97 is hooked at one end on the bellcrank arm 89 and is secured at its other end to the lower link 91 at a point rearwardly of the pivot pin 93. In the position of the parts as shown in Fig. 1, the coil spring 97 is in a state of axial stress which tends to urge the lower link 91 forwardly so that the axial extension of the pivot pin 93 will bear against the forward end of the slot in the side arm 76 of the bracket 73, and so that the reciprocable control element 26 will be urged toward its inoperative position. The pivot pin 94 is similarly urged against the forward end of the slot 96 of the bracket arm 77 by another coil spring (not shown) which is operatively interposed between the lever arm 83 and the lower link 92 in the same manner as has been described with reference to the coil spring 97.

The stationary stops afforded by the forward ends of the slots 96 in the side arms 76, 77 of the bracket 73 are engageable by the movable stops 93, 94, respectively, upon movement of the control levers 46, 47 into their straight course driving positions, and the springs 97 on the lower links 91 and 92, respectively, are operative to urge said links forwardly and thereby urge the control elements 26, 27 toward their inoperative positions in which they are shown in Fig. 2.

The lower link 91 includes a turnbuckle 98 which may be adjusted to shorten or lengthen the center distance between the pivot pin 93 and another pivot pin 99 by means of which the lower link 91 is pivotally connected at its rear end to the control plunger 26. The lower link 92 includes a similar turnbuckle 101, Figs. 2 and 3, which may be adjusted to lengthen or shorten the center distance between the pivot pin 94 and a pivot pin 102 by means of which the lower link 92 is pivotally connected to the control plunger 27.

In order to operate the tractor, a driver may take a sitting position on the seat cushion 29, which as shown in Figs. 1 and 2, is spaced a substantial distance rearwardly from the dash panel 36, so that the driver while sitting on the seat may place his legs in a natural and convenient position forwardly of the seat. It will be noted that the leg space in front of the driver's seat is not obstructed by the bracket 48, and that the control levers 46 and 47 are mounted on said bracket for movement relative thereto within operating ranges above said leg space. The full line straight course driving position in which the control lever 46 is shown in Fig. 1 corresponds to fully engaged condition of the left hand steering clutch 16, and the control lever 46 is resiliently held in this position by the action of the coil spring 97. The same explanations apply analogously to the control lever 47. In the straight course driving positions of the control levers 46 and 47, the short arms 51 and 52 of these levers extend upwardly and forwardly from the shaft 49 in the same radial direction, and the arms 63 and 68 of the upper rock shaft 59 and of the tubular shaft 67, respectively, also extend upwardly and forwardly in the same radial direction from the axis of the upper rock shaft 59. Under these conditions the arms 64 and 69 of the upper rock shaft 59 and of the tubular shaft 67, respectively, extend forwardly and downwardly in the same radial direction from the axis of the upper rock shaft 59, and the arms 82 and 87 of the lower rock shaft and of the bellcrank lever 86, respectively, extend forwardly and downwardly in the same radial direction from the axis of the lower rock shaft 72. These positions of the arms 82 and 87 are determined by engagement of the pivot pins 94 and 93, respectively, with the forward ends of the slots in the bracket arms 77 and 76. The up and down reciprocable links 84 and 88 are suitably constructed to permit length adjustment thereof, so that the stop 53 on the control lever 46 and the corresponding stop of the control lever 47 will bear against the stops 55 and 55' at the upper ends of the respective slots in the bracket 48 when the pivot pins 93 and 94 bear against the forward ends of the slots in the side arms 76 and 77, respectively, of the bracket 73.

By taking hold of the handle of the control lever 46, the driver may swing this lever downwardly from the full line straight course driving position to the dotted line vehicle turning position 46' shown in Fig. 1, and as a result of such downward swinging movement of the control lever 46 the link 66 will be moved backwardly and the link 88 will be swung upwardly. Such upward swinging movement of the link 88 is transmitted to the lower link 91 through the bellcrank lever 86, and as a result, the lower link 91 will be moved backwardly from the position in which it is shown in Fig. 1, and the control plunger 26 will likewise be moved backwardly from its inoperative position until the pivot pin 93 engages the rear end of the slot in the bracket arm 76. The travel of the control plunger 26 from its inoperative to its operative position, which is effected by the mentioned downward swinging movement of the control lever 46, and which travel is indicated in Fig. 1 by the distance C, causes the power control unit 24 to disengage the left hand steering clutch 16 by swinging movement of the actuating arm 19 in the direction of arrow A in Fig. 2. The right hand steering clutch 14 may be similarly disengaged by downward swinging movement of the control lever 47 from its straight course driving to its vehicle turning position. That is, when the right hand control lever 47 is swung downwardly on the bracket 48 from its straight course driving position, the upper link 71 is moved backward, the link 84 is swung upward, and the lower link 92 is moved backward, with the result that the power control unit 24 becomes effective, in response to backward movement of the control plunger 27 from its inoperative to its operative position, to swing the actuating arm 22 in the direction of arrow B in Fig. 2.

Wear of the steering clutches 14 and 16 may make it necessary to adjust the control plungers 27 and 26, respectively, to forwardly advanced positions relative to the housing of the power control unit 24. This may readily be accomplished, without disturbing the straight course driving and vehicle turning positions of the control levers 46 and 47, by adjustment of the turnbuckles 98 and 101, respectively.

In addition to the control levers 46 and 47, a gear shift lever 103, an actuating lever 104 for the master clutch, and a pair of control pedals 106 and 107 for the steering brakes (not shown) are mounted at the driver's station within reach from the driver's seat. It will be noted that ample space is provided forwardly of the arm rest 34 and of the seat cushion 31, which affords convenient access to the seat cushion 29. The control levers 46 and 47 are arranged in such relation to the driver's seat that they do not objectionably interfere with the movements of the driver when he wants to get into and out of a sitting position on the seat cushion 29, and are out of his way when he wants to operate the tractor from a standing position in front of the seat cushion 29 and directly behind the control levers 46 and 47.

When the tractor is operated to pull a self-loading scraper or other trailing equipment, it is necessary for the driver to frequently turn around and observe or adjust the trailing equipment. The mounting of the control levers 46 and 47 in an elevated position on the dash panel 36 provides an unobstructed leg space in front of the seat cushion 29 which enables the driver to move his legs sidewise to a natural or convenient position when he turns around in the seat in order to observe or adjust the trailing equipment.

In general terms, the power transmitting mechanism which includes the bevel gears 4 and 6, the steering clutches 14, 16, and the track belt drive sprockets 2 and 3, together with the track belts 43 and 44, may be considered as propelling means which are operable to effect either straight course driving or turning, and the levers 46 and 47 represent a pair of manually operable control levers for said propelling means which are mounted in front of the driver's seat 29 for back and forth movement between straight course driving and vehicle turning positions, as explained hereinbefore. The bracket 48 provides a fore and aft extending support which is mounted in forwardly spaced and elevated relation to the driver's seat so as to afford an unobstructed leg space of predetermined length and height below said support and forwardly of said seat. The control levers 46 and 47 are mounted on a rearward portion of said support for movement relative thereto so that the handle ends of said levers are located forwardly of and in elevated relation to the seat 29 when said levers are in the mentioned straight course driving positions, as illustrated by the full line position of the lever 46 in Fig. 1, and also when said levers are in the mentioned vehicle turning positions, as illustrated by the dotted line position 46' of the lever 46 in Fig. 1. The levers 46 and 47 are operatively connected with a pair of reciprocable control elements 26 and 27 for said propelling means, below the seat by means of mechanical operating connections which are constructed, mounted and arranged so as to clear said leg space and so as to move said control elements back and forth between inoperative and operative positions by said back and forth movements of the control levers 46, 47 between their straight course driving and vehicle turning positions. It will be noted that the up and down reciprocable links 84 and 88 are located at a forward distance from the driver's seat so as to be out of the way of the driver's feet, and that the bracket 48 which houses the upper links 66 and 71 is mounted on the dash 36 in a sufficiently elevated position to afford ample leg room forwardly of the driver's seat. The lower links 91 and 92, the bracket 73 and associated rock arms are mounted below the floor plate 39 and therefore do not obstruct the leg space in front of the driver's seat.

It should be understood that it is not intended to limit the invention to the hereinabove described forms and details, and that the invention includes such other forms and modifications as are embraced by the scope of the appended claims.

It is claimed and desired to secure by Letters Patent:

1. In a tractor having propelling means operable to effect either straight course driving or turning, and a pair of manually operable control levers for said propelling means mounted in front of a driver's seat for back and forth movement between straight course driving and vehicle turning positions, the combination of a fore and aft extending support mounted in forwardly spaced and elevated relation to said seat to afford an unobstructed leg space of predetermined length and height below said support and forwardly of said seat, means mounting said control levers on a rearward portion of said support for movement relative thereto so that the handle ends of said levers are located forwardly of and in elevated relation to said seat when said levers are in said straight course driving positions and also when said levers are in said vehicle turning positions, and mechanical operating connections between said control levers, respectively, and a pair of control elements for said propelling means located below said seat, said operating connections being constructed, mounted and arranged so as to clear said leg space, and so as to move said control elements back and forth between inoperative and operative positions thereof by said back and forth movements of said control levers.

2. In a tractor having propelling means operable to effect either straight course driving or turning, and a pair of manually operable control levers for said propelling means mounted in front of a driver's seat for back and forth movement between straight course driving and vehicle turning positions, the combination of a fore and aft extending support mounted in forwardly spaced and elevated relation to said seat to afford an unobstructed leg space of predetermined length and height below said support and forwardly of said seat, means mounting said control levers on a rearward portion of said support for movement relative thereto so that the handle ends of said levers are located forwardly of and in elevated relation to said seat when said levers are in said straight course driving positions and also when said levers are in said vehicle turning positions, a pair of fore and aft reciprocable lower links underlying said leg space and operatively connected, respectively, at their rear ends with a pair of reciprocable control elements for said propelling means, and means including a pair of up and down reciprocable links forwardly of said leg space, for connecting said fore and aft reciprocable links, respectively, in operative relation with said control levers, so that said control elements will be moved back and forth between inoperative and operative positions thereof by said back and forth movements of said control levers.

3. In a tractor as set forth in claim 2, movable stop means associated, respectively, with said lower links, stationary stop means engageable by said movable stop means to determine a limit position of each of said lower links, and resilient means operative to urge each of said lower links toward said limit position thereof.

4. In a tractor as set forth in claim 2, movable stop means associated, respectively, with said lower links, stationary stop means cooperable with said movable stop means to determine a forward and rearward limit position of each of said lower links, and resilient means associated, respectively, with said lower links and operative to urge each of said lower links toward one of said limit positions thereof.

5. In a tractor having propelling means operable to effect either straight course driving or turning, and a pair of manually operable control levers for said propelling means mounted in front of a driver's seat for back and forth movement between straight course driving and vehicle turning positions, the combination of an upright wall member mounted forwardly of said seat and spaced from the latter to afford an unobstructed leg space of predetermined length forwardly of said seat, a bracket mounted on said wall member in rearwardly overhanging relation thereto and in overlying relation to said leg space, means mounting said control levers on a rearward portion of said bracket for pivotal up and down movement relative thereto so that the handle ends of said levers are located forwardly of and in elevated relation to said seat when said levers are in said straight course driving positions and also when said levers are in said vehicle turning positions, a pair of fore and aft reciprocable upper links in overlying relation to said leg space and operatively connected, respectively, at their rear ends with said control levers, and means including a pair of up and down reciprocable links forwardly of said leg space, for connecting the forward ends of said upper links, respectively, in power transmitting relation with a pair of reciprocable control elements for said propelling means, so that said control elements will be moved back and forth between inoperative and operative positions thereof by said back and forth movements of said control levers.

6. In a tractor as set forth in claim 5, stationary stop means associated with said bracket, movable stop means associated, respectively, with said control levers and cooperable with said stationary stop means to determine a limit position of each of said control levers, and resilient means operative to urge each of said control levers toward said limit position thereof.

7. In a tractor having propelling means operable to effect either straight course driving or turning, and a pair of manually operable control levers for said propelling means mounted in front of a driver's seat for back and forth movement between straight course driving and vehicle turning positions, the combination of an upright wall member mounted forwardly of said seat and spaced from the latter to afford an unobstructed leg space of predetermined length forwardly of said seat, a bracket mounted on said wall member in rearwardly overhanging relation thereto and in overlying relation to said leg space, means mounting said control levers on a rearward portion of said bracket for pivotal up and down movement relative thereto so that the handle ends of said levers are located forwardly of and in elevated relation to said seat when said levers are in said straight course driving positions and also when said levers are in said vehicle turning positions, a pair of fore and aft reciprocable upper links in overlying relation to said leg space and operatively connected at their rear ends, respectively, with said control levers, a pair of fore and aft reciprocable lower links in underlying relation to said leg space and operatively connected, respectively, at their rear ends with a pair of reciprocable control elements for said propelling means, and means including a pair of up and down reciprocable links forwardly of said leg space for connecting the forward ends of said upper links, respectively, in power transmitting relation with the forward ends of said lower links, so that said control elements will be moved back and forth between inoperative and operative positions thereof by said back and forth movements of said control levers.

8. In a tractor as set forth in claim 7, stationary stop means associated with said bracket, movable stop means associated, respectively, with said control levers and cooperable with said stationary stop means to determine said straight course driving positions of said control levers, other movable stop means associated, respectively, with said lower links, other stationary stop means engageable by said other movable stop means upon movement of said control levers into said straight course driving positions, and resilient means operative to urge said reciprocable control elements toward said inoperative positions thereof.

9. In a tractor having propelling means operable to effect either straight course driving or turning, and a control mechanism for said propelling means including a pair of relatively movable control elements, the combination of a first rock shaft mounted for pivotal movement about an axis extending transversely of the tractor, a pair of first lever arms nonrotatably secured to said first rock shaft in axially spaced and angularly displaced relation to each other, one of said first lever arms serving to apply manual rocking movement to said first rock shaft, a tubular shaft rotatably surrounding said first rock shaft intermediate said first lever arms, a pair of second lever arms nonrotatably secured to said tubular shaft in axially spaced and angularly displaced relation to each other, the second lever arm adjacent to said one first lever arm serving to apply manual rocking movement to said tubular shaft, a second rock shaft mounted for pivotal movement about an axis spaced from the axis of said first rock shaft and extending transversely of the tractor, a pair of third lever arms nonrotatably secured to said second rock shaft in axially spaced and angularly displaced relation to each other, one of said third lever arms being link connected to the other of said second lever arms, a bellcrank lever pivoted coaxially with said second rock shaft intermediate said third lever arms and having one arm thereof link connected to the other of said first lever arms, and means operatively connecting said control elements, respectively, with the other of said third lever arms and with the other arm of said bellcrank lever.

10. In a tractor having a dash panel, an operator's seat rearwardly of said dash panel, and a deck extending between said dash panel and seat, the combination of a pair of double armed upper rockers mounted on said dash panel in elevated relation to said deck for pivotal movement relative to each other, a pair of manually operable control levers mounted on said dash panel rearwardly of said upper rockers for pivotal movement relative to each other and within reach from said seat, a pair of fore and aft reciprocable links pivotally connected at their rear ends, respectively, with said control levers, and pivotally connected at their front ends, respectively, with one arm of one of said upper rockers, and with one arm of the other of said upper rockers, a pair of double armed lower rockers mounted below said deck for pivotal movement relative to each other, a pair of up and down reciprocable links pivotally connected at their upper ends, respectively, with the other arms of said upper rockers and pivotally connected at their lower ends, respectively, with one arm of one of said lower rockers and with one arm of the other of said lower rockers, a pair of fore and aft reciprocable lower links below said deck pivotally connected at their forward ends, respectively, with the other arms of said lower rockers, and power control means operatively connected with the rear ends, respectively, of said lower links.

11. In a tractor having an operator's platform and a dash panel at a forward part of the latter, the comination of a bracket mounted on said dash panel and extending rearwardly therefrom in elevated relation to said platform, a pair of manually operable control levers mounted on said bracket for pivotal movement relative to each other about a transverse axis at a predetermined rearward spacing from said dash panel, an upper transverse rock shaft mounted on said dash panel in upwardly spaced relation to said platform and in forwardly spaced relation to the axis of said control levers, a pair of first lever arms nonrotatably secured to said upper rock shaft in axially spaced and angularly displaced relation to each other, one of said first lever arms being link connected to one of said control levers, a tubular shaft rotatably surrounding said upper rock shaft intermediate said first lever arms, a pair of second lever arms nonrotatably secured to said tubular shaft in axially spaced and angularly displaced relation to each other, one of said second lever arms being link connected to the other of said control levers, a lower rock shaft mounted below said platform, a pair of third lever arms nonrotatably secured to said lower rock shaft in axially spaced and angularly displaced relation to each other, one of said third lever arms being link connected to the other of said second lever arms, a bellcrank lever pivoted coaxially with said lower rock shaft intermediate said third lever arms and having one arm thereof link connected to the other of said first lever arms, and a pair of power control elements operatively connected, respectively, with the other of said third lever arms and with the other arm of said bellcrank lever.

ALFRED C. BOOCK.
DOUGLAS W. ERSKINE.

REFERENCES CITED

The following references are of record in the file of this patent:

UNITED STATES PATENTS

| Number | Name | Date |
| --- | --- | --- |
| 1,270,774 | Belden | July 2, 1918 |
| 1,758,216 | Brey | May 13, 1930 |
| 2,018,023 | Kliesrath | Oct. 22, 1935 |
| 2,095,559 | Starr et al. | Oct. 12, 1937 |
| 2,129,851 | Lee | Sept. 13, 1938 |
| 2,219,601 | Quartullo | Oct. 29, 1940 |
| 2,369,936 | Barth et al. | Feb. 20, 1945 |